Nov. 28, 1961            A. DREW            3,010,564

BAGGAGE HANDLING SYSTEM AND APPARATUS THEREFOR

Filed Dec. 10, 1958            4 Sheets-Sheet 1

INVENTOR.
ADRIAN DREW

BY *H. F. Woodward*
           Atty.

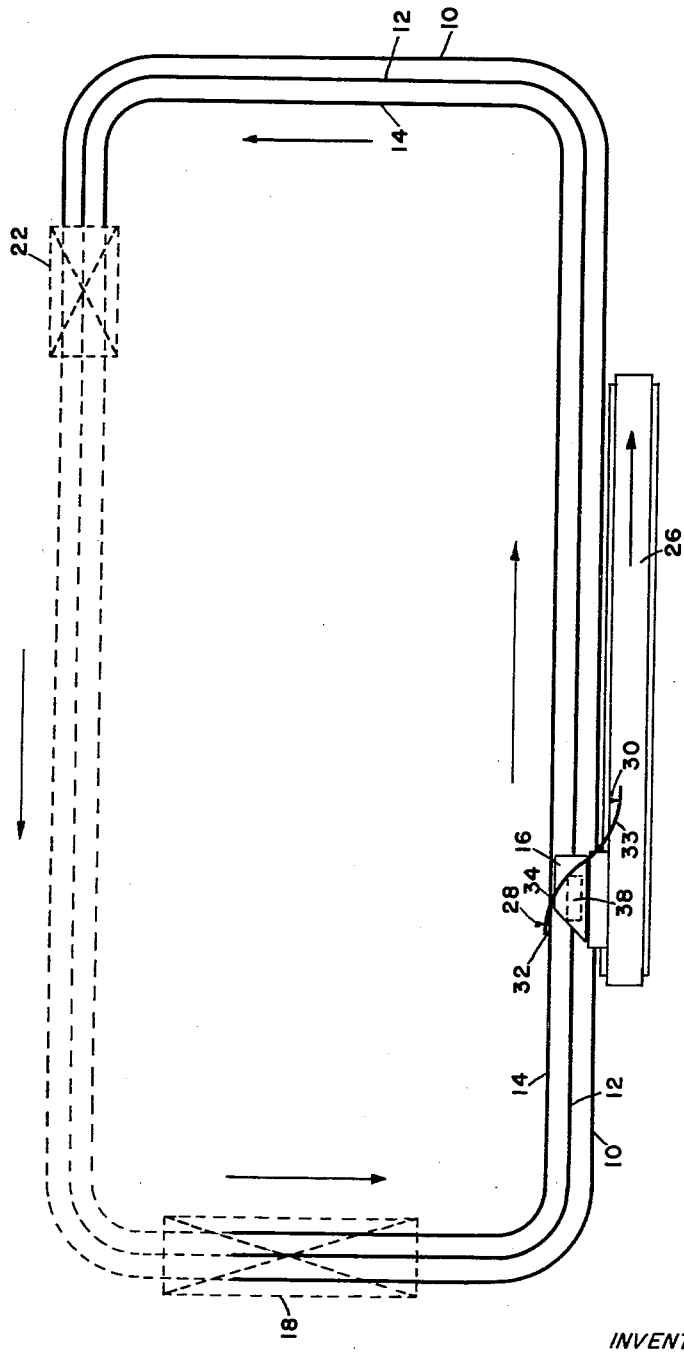

Nov. 28, 1961  A. DREW  3,010,564
BAGGAGE HANDLING SYSTEM AND APPARATUS THEREFOR
Filed Dec. 10, 1958  4 Sheets-Sheet 3

INVENTOR.
ADRIAN DREW
BY H. F. Woodward
ATTY

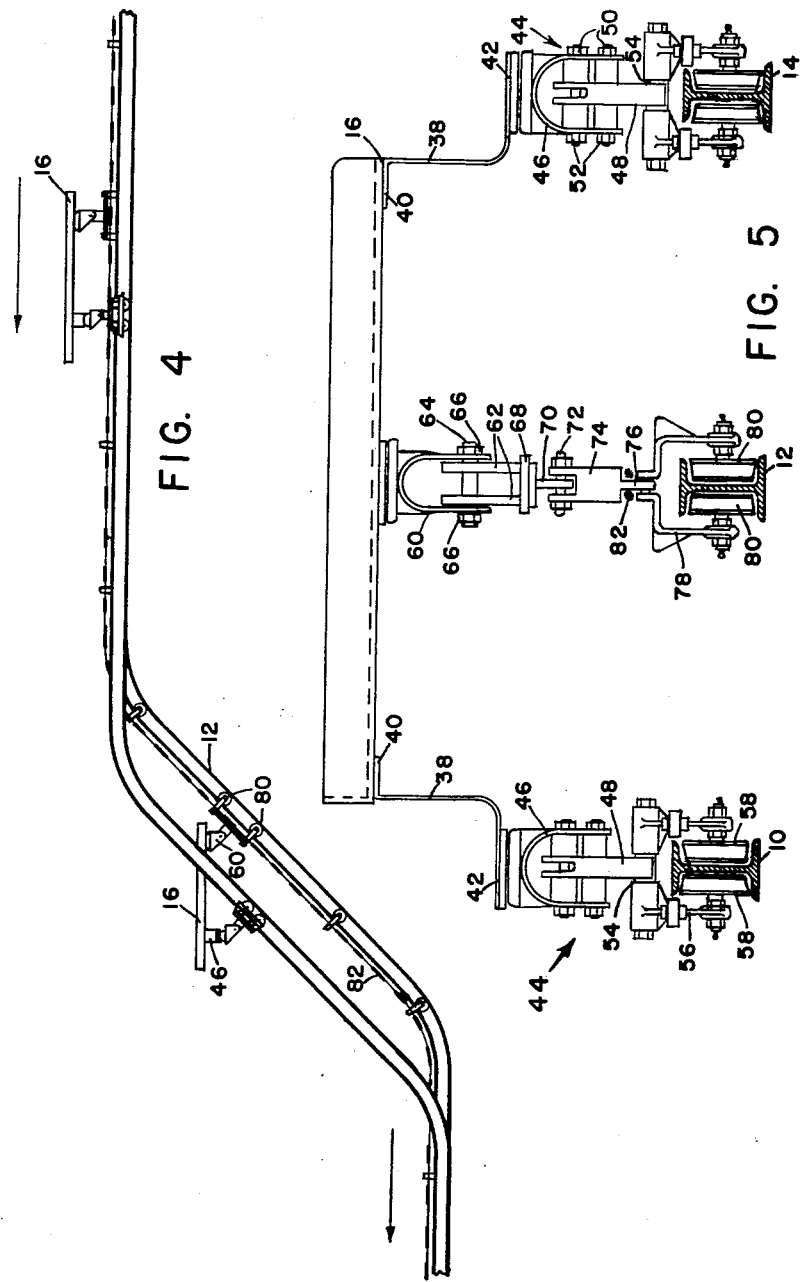

_United States Patent Office_ 3,010,564
Patented Nov. 28, 1961

3,010,564
BAGGAGE HANDLING SYSTEM AND
APPARATUS THEREFOR
Adrian Drew, 696 Lindwood, St. Paul, Minn.
Filed Dec. 10, 1958, Ser. No. 779,322
3 Claims. (Cl. 198—138)

This invention relates to a system for handling baggage at airports, train stations and the like and to apparatus designed for use in the practice of the system.

In handling baggage of passengers, particularly in airports, considerable difficulty and confusion exists and it is difficult to handle baggage of passengers checking in, the passengers bring their baggage to the passengers agents' station and at which time it is weighed to determine if it is within limit permitted wtihout payment of extra tariff. After weighing of the baggage it must be moved generally to a lower level for loading onto the proper airplane.

Having the foregoing in mind, the particular object of the present invention is the provision of a system and apparatus for handling baggage for passengers checking-in which will quickly, economically, and safely convey the baggage to a loading level.

A particular object is the provision of a movable arrangement on which baggage can be placed and which moves to a lower level or floor with the baggage remaining in the same relative position on the moving arrangement as it was placed thereon.

Another object is the provision of a movable conveyor for carrying baggage from the checking-in station to an unloading place at a lower level where they are automatically removed from the moving conveyor.

These and other objects of this invention will be more apparent upon reference to the following specification taken in connection with the accompanying drawings, which illustrates one embodiment of the same by way of example. It will, however, be understood that this example, has been selected in order to explain the system according to the invention and does not include a survey of the various modifications to which the system may be subjected. Modifications of the example shown do therefore, not necessarily involve a departure from the invention.

In the drawing similar characters of reference indicate corresponding parts in the several views:

FIGURE 3 is a top plan view in schematic form of the baggage conveying system with the upper loading level in dotted lines;

FIGURE 4 is a side elevational view with parts broken away showing the level position of a baggage carrying unit on the descent;

FIGURE 5 is a front end view of the luggage carrying unit in position on the trackage.

Figure 1:
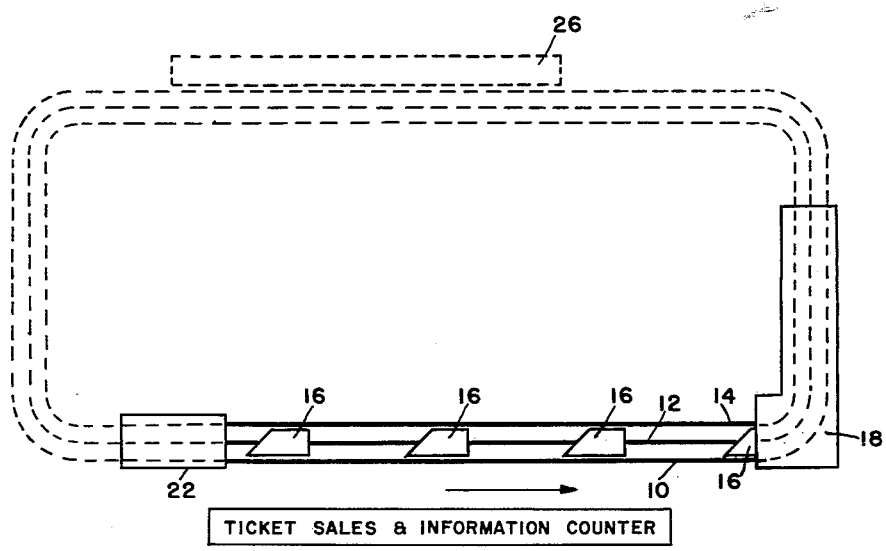
FIGURE 1 is a top plan view in schematic form of the system with the portions on the lower level in dotted lines.
Figure 2:
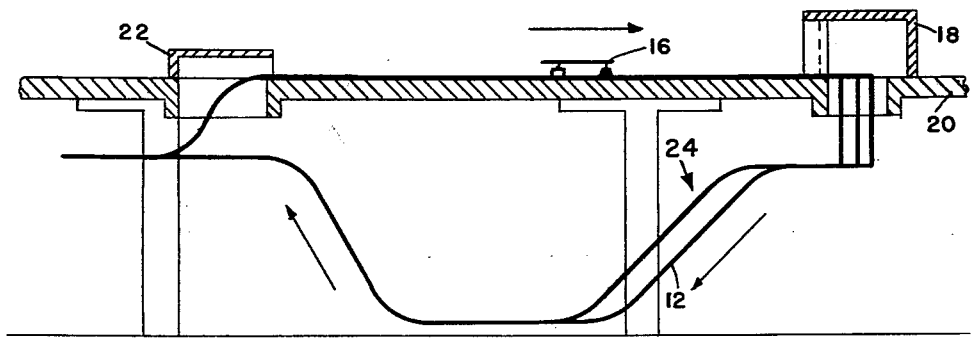
FIGURE 2 is a side elevational view of the system shown in FIGURE 1.

The system in general will be explained in connection with FIGURES 1, 2 and 3 showing a baggage moving equipment with a portion on one floor and the remainder on a lower floor. The system includes three rails 10, 12 and 14 which are spaced apart and on the upper floor positioned directly behind the passengers agents' stations. In predetermined spaced relationship on the rails are mounted baggage holding trays 16. The trays are generally trapezium shaped as shown in FIGURE 1 and travel in the direction shown by the arrows. Housing 18 is supported on upper floor 20 and covers the tracks descent to the lower level. Where the trays or carts return to the upper level, housing 22 supported by floor 20 is provided.

To insure that the baggage carts or trays 16 remain in a level position on the descent to the lower floor track 12 must be positioned in a plane below tracks 10 and 14 as indicated generally at 24 in FIGURE 2.

On the lower floor, as shown in solid line in FIGURE 3, there is positioned an unloading station 26 substantially parallel to the tracks. It is preferred that the unloading station 26 be a conveyor of the endless belt type. Secured to the lower floor adjacent the rail 14 is post 28 and adjacent the endless conveyor is post 30. Carried by these posts is unloading bar 32. Bar 32 extends from beyond the edge of track 14 and curves at 34 to a point substantially where it passes over rail 10 and then curves at 33 over the endless conveyor. The double curved bar 32 sweeps baggage 38 from the tray 16 to the unloading station 26 in upright position. In FIGURE 3 is shown the bar 32 curving first in the direction of the travel of the trays and then curving in the direction opposite to the travel of the trays.

Figure 6:
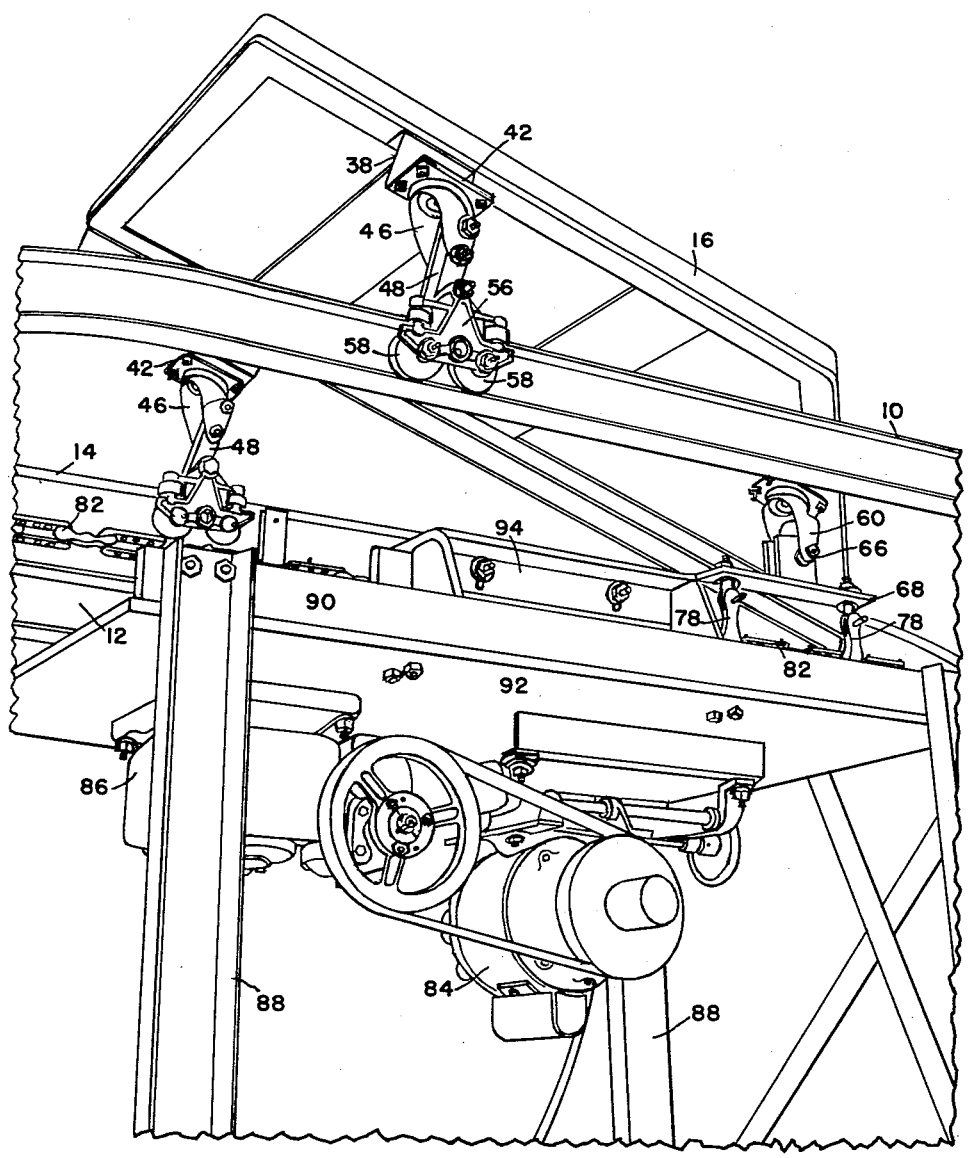
FIGURE 6 is a side view with parts broken away, at the luggage carrying unit at the driving station for the endless chain.

Tray 16 is preferably of less width than the distance between rails 10 and 14 and hangers 38 are secured at one end 40 to the tray 16, in any suitable manner with the other end 42 bent outwardly in a plane substantially parallel with the tray 16. Secured to ends 42 are wheels support means indicated generally at 44. Yolks 46 are secured to ends 42 by a king pin which permits movement between ends 42 and the yolks 46. Bars 48 are secured to yolks 46 by suitable means such as pins 50 which are machined to receive mating members 52. Bars 48 are hingedly mounted on pin 54. On pin 54 is movable mounted wheel support frame 56 to which are rotatable mounted two wheels 58 on each side of rails 10 and 14. Secured to substantially mid-way between the side of the tray 16 adjacent the rear end is yoke 60. The yoke being secured by a king pin to permit relative movement between tray 16 and yoke 60. Arms 62 are swingably mounted on pin 64 which is held in place by nuts 66. Depending from bar 68, attached to arm 62 is member 70. A pin 72 passes member 70 for supporting wheel arm 74 which terminates in end 76. The end 76 supports wheel frame 78 on which are mounted wheels 80. It is preferred that the tracks 10, 12 and 14 be in the shape of I beams as shown in FIGURE 5. The end 76 passes through a link of endless chain 82. The chain is driven by any suitable means such as shown in FIGURE 6.

The chain 82 may be of any suitable type where the end 76 of arm 74 can extend through link of the chain. As shown in FIGURE 6 the power for moving the trays 16 through chain 82 may be a motor 84 and suitable driving mechanism. The motor speed control mechanism 86 and driving mechanism are supported by suitable frame work comprising uprights 88 and horizontal members 90 and plate 92 which is secured to horizontal members 90. The rail 12 on which wheels 80 travel must pass through driving housing unit 94 where a suitable sprocket or the like imparts motion to the chain 82. The speed control mechanism may be a "Reeves" drive. For the best results the driving mechanism should be positioned after the unloading station 26.

In operation the passengers bring their baggage to the ticket sales counter and after weighing thereof, the baggage is placed in tray or cart 16. The trays are continually moving and baggage placed thereon is immediately moved to a lower floor and removed from the trays at the unloading station. By the arrangement shown in the drawings the baggage remains in the position it was placed on the trays while traveling to the lower level. Also by the arrangement shown a minimum of space is used for the system. Tray as used herein means baggage or package carrier with a substantially level floor. It is to be understood that the chain used for connecting the trays may be changed to a cable or the like and chain as used herein is intended to include any apparatus that connects the trays and to which driving energy may be applied.

What is claimed:

1. A system for an airport for moving baggage and the like from an upper floor to a lower floor wherein the baggage remains in a predetermined position during transportation, including a ticket sales area on the upper floor and a baggage-receiving station on the lower floor, the improvement comprising three spaced-apart rails which extend across the upper floor horizontally and then slope downwardly to the lower floor, extend along the lower floor and then slope upwardly to the upper floor; the central rail in a plane below the other two rails only on the downward slope; wheeled conveyor units having a load-receiving surface supported on said rails, three wheel support means attached to said conveyor units' load-receiving surface and depending therefrom, said wheel support means having yokes operatively attached to the said conveyor units' support surface and depending therefrom; a pin hingedly connecting a bar to said yokes, said bar depending from said pin; a second pin extending through the bar; wheel support frames mounted on the second pin; and wheels carried by the wheel frames; a chain arranged adjacent the center rail and attached to only one of the three wheel support means of the said conveyors; means for driving the chain; and discharge bar means attached to opposite side of said tracks and extending across said tracks adjacent a baggage-receiving station on the lower floor.

2. In a system for an airport for moving baggage from an upper floor to a lower floor wherein the baggage remains in a predetermined position during transportation and during discharge from a moving means, comprising three spaced-apart rail tracks with the middle rail spaced below the other two rails only on the descent from the upper to the lower floor, a series of wheeled carriages having a baggage-receiving surface supported on the tracks, three wheel support means, the wheel support means comprising a yokes operatively attached to said carriages' baggage-receiving surface and depending therefrom, pins extending through the yokes in a generally horizontal position, a swingable bar mounted on said pins and depending therefrom, a second pin extending through said bars, wheel support frames mounted on said second pin, wheels carried by said frame members and riding on said rails, a curve discharge member rigidly attached on opposite sides of the track and extending across the track, said discharge member curving in the direction of travel of the carriages and then curving in the opposed direction of the travel of said carriages.

3. In a system for moving baggage from an upper floor to a lower floor, comprising a series of carriages having a load-supporting member, each carriage provided with three wheel support means, two of said wheel support means adjacent one end of the carriages and the third wheel support means at the other end of said carriages and spaced between the two previously mentioned wheels, said wheel support means attached to the bottom of the said carriage by a yokes, swingable bars and pins, three spaced-apart rails upon which the said wheeled carriages move, said rails extending from an upper floor to a lower floor with the middle rail in a plane below the other two rails only on the descent from the upper floor to the lower floor, and driving means associated with the middle rail and attached to one wheel support means of each carriage, and means for propelling the driving means, and a curve discharge member rigidly attached on opposite sides of the track and extending across said track.

References Cited in the file of this patent

UNITED STATES PATENTS

| 708,663 | Reno | Sept. 9, 1902 |
| 930,138 | Boninie | Aug. 3, 1909 |
| 1,448,119 | Hutton | May 13, 1923 |
| 1,845,562 | Sandberg | Feb. 16, 1932 |
| 1,875,183 | Spriggs | Aug. 30, 1932 |
| 2,128,492 | Mena | Aug. 30, 1938 |
| 2,253,265 | Cornett | Aug. 19, 1941 |
| 2,369,557 | Gettelman | Feb. 13, 1945 |
| 2,656,032 | Stern | Oct. 20, 1953 |
| 2,896,772 | Daigle | July 28, 1959 |

FOREIGN PATENTS

| 1,174,029 | France | Nov. 3, 1958 |